E. K. BAKER.
DEMOUNTABLE RIM FOR AUTOMOBILE WHEELS.
APPLICATION FILED MAR. 10, 1914.

1,155,398.

Patented Oct. 5, 1915.
3 SHEETS—SHEET 1.

Witnesses

Inventor
Erle K. Baker
By
Attorney

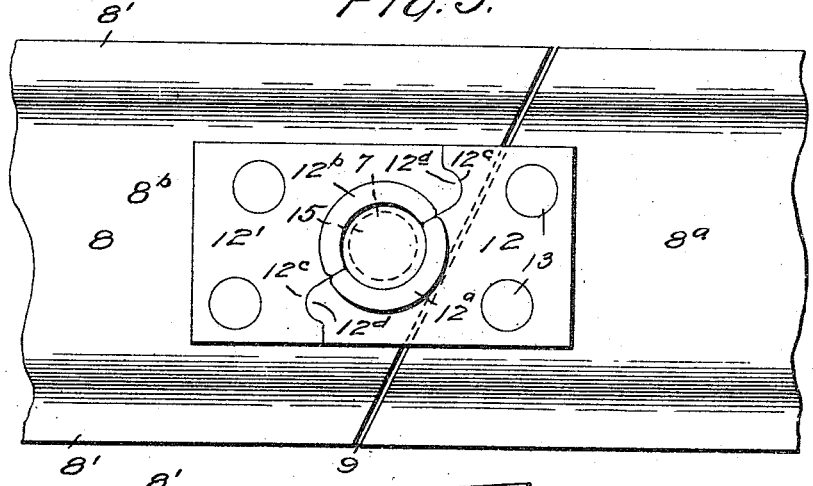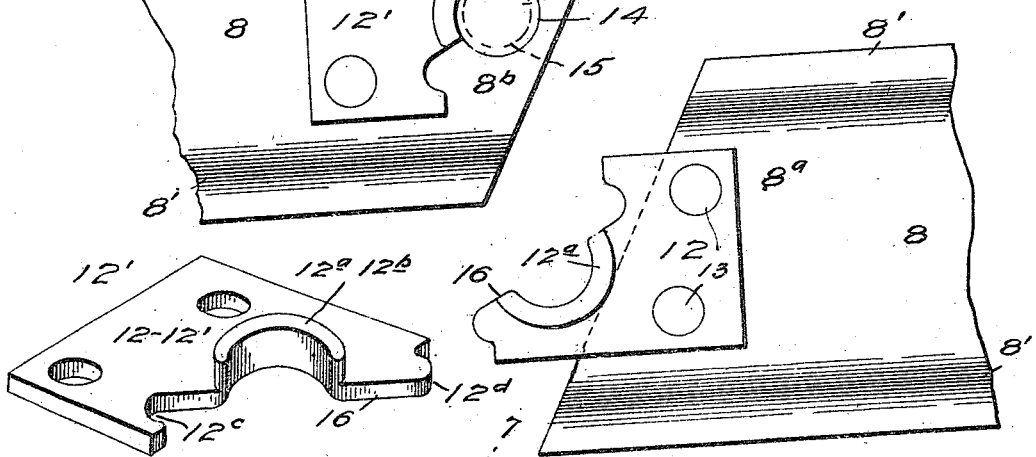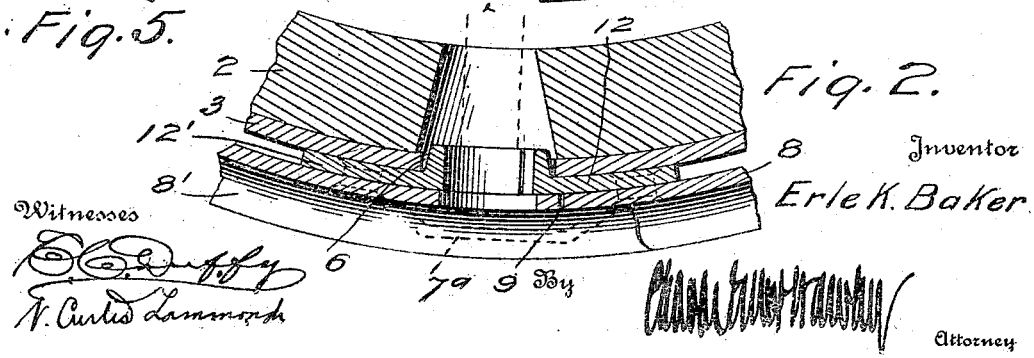

E. K. BAKER.
DEMOUNTABLE RIM FOR AUTOMOBILE WHEELS.
APPLICATION FILED MAR. 10, 1914.
1,155,398.
Patented Oct. 5, 1915.
3 SHEETS—SHEET 3.
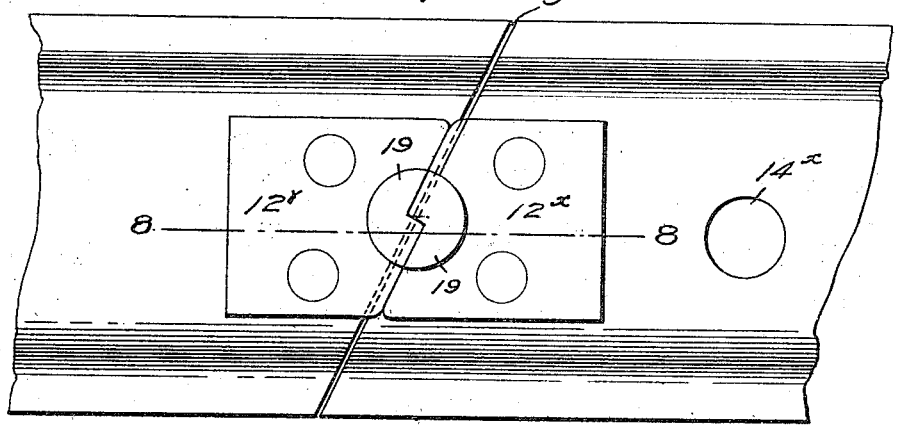
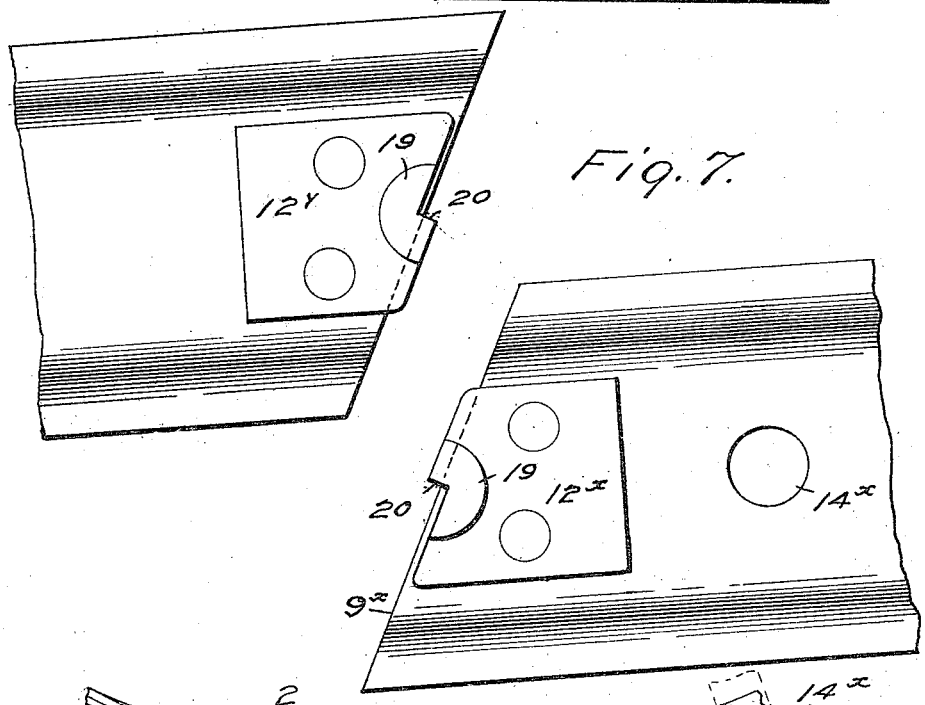

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM FOR AUTOMOBILE-WHEELS.

1,155,398.  Specification of Letters Patent.  Patented Oct. 5, 1915.

Application filed March 10, 1914. Serial No. 823,805.

*To all whom it may concern:*

Be it known that I, ERLE K. BAKER, a citizen of the United States, and a resident of Chicago, county of Cook, and State of Illinois, have invented certain new and useful Improvements in Demountable Rims for Automobile-Wheels, of which the following is a specification.

My invention relates to demountable tire-carrying rim constructions for automobile wheels and has special reference to improvements in and upon demountable rims of the transversely split and bolted-on type.

An object of my invention is to provide a demountable rim of more simple construction and of lower cost than any now in use; which more easily may be placed in and taken from a pneumatic tire; and which may be used interchangeably upon most automobile wheels now in use.

A further object of my invention is to dispense with the many parts which are now used to connect the ends of such a rim and in place thereof substitute a virtually single member which preferably shall serve all the purposes of a spacer, a connector, an aliner, a driver and a valve stem container, whereby the construction of the rim may be greatly simplified while maintained at maximum the necessary qualities of strength, rigidity, durability, safety, efficiency and ease of operation.

My invention resides in the novel constructions and combinations of parts hereinafter described and more particularly pointed out in the appended claims and will be more readily understood by reference to the accompanying drawings forming a part of the specification, and in which—

Figure 1:
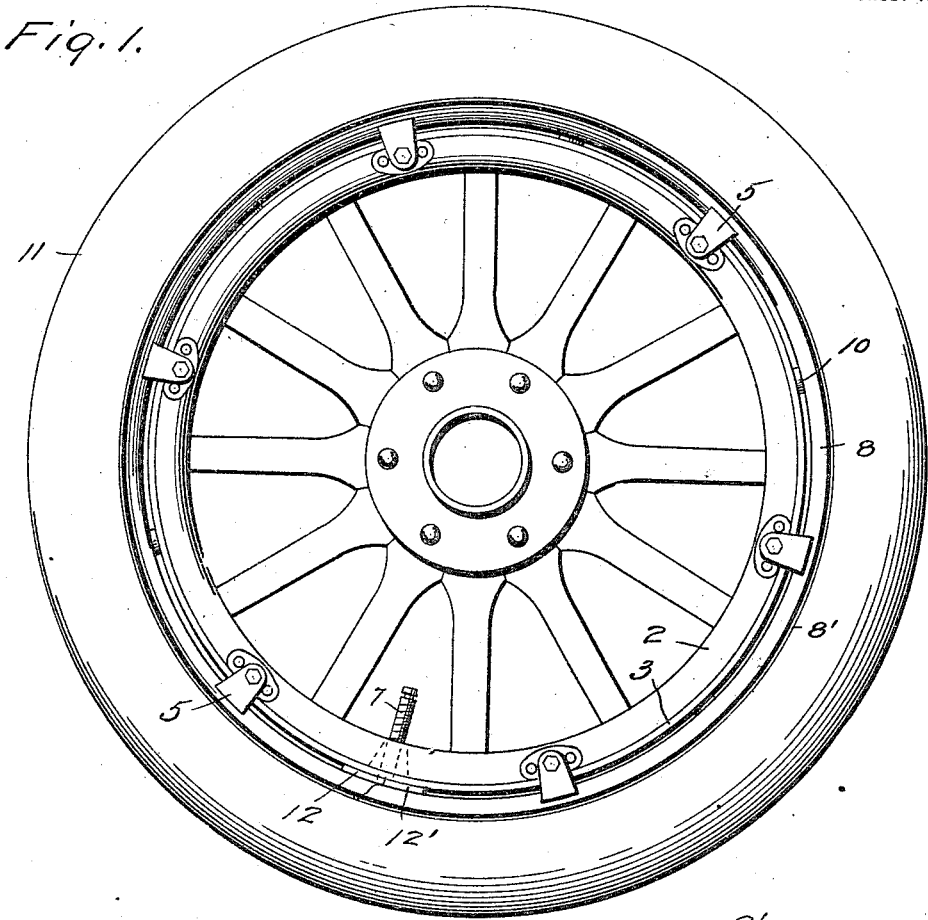
Figure 9:
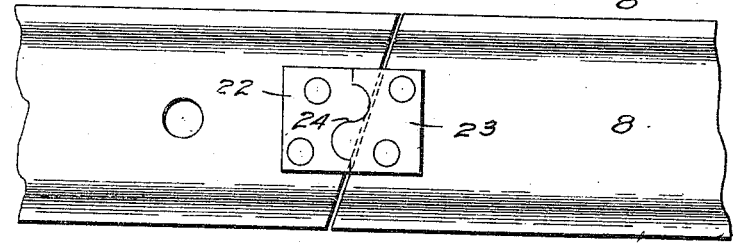
Figure 10:
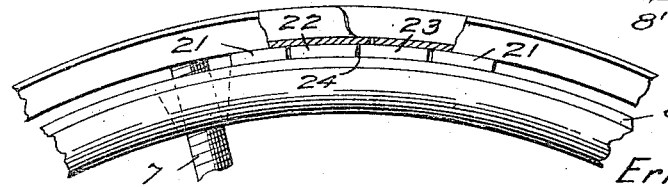

Figure 1 is a side view of an automobile wheel equipped with a pneumatic tire mounted upon a demountable rim embodying my invention; Fig. 2 is an enlarged vertical and longitudinal section of the wheel, rim and tire, adjacent the valve stem; Fig. 3 shows the connecting device as it appears on the inner periphery of the rim; Fig. 4 is a similar view showing the ends of the rim separated; Fig. 5 is a perspective view of one of the complementary parts of the connecting device; Fig. 6 is like unto Fig. 3 and shows a connecting device of modified construction, inasmuch as it does not accommodate the valve stem; Fig. 7 shows the construction of Fig. 6, as it appears when the rim ends are separated; Fig. 8 is a longitudinal vertical section on the line 8—8 of Fig. 6, showing the rim in position upon the wheel felly; Fig. 9 is an inner side view of another modification of my connecting device; and, Fig. 10 is a side view thereof, as the same appears upon the felly of the wheel.

In these drawings I have shown a typical automobile wheel having a wooden felly 2 and a metal felly band 3. The latter may be provided with the usual inner-side flange (not shown) against which the rim is thrust by bolt-actuated wedge-lugs 5, of usual construction.

The invention is not limited to a felly band flanged on the inner side of the felly, for in lieu of the flange on the felly band I may, and at times do, employ an inner-side set of wedge-lugs, after the manner shown in application Serial No. 685,103, filed May 20, 1912.

Further, my invention is not limited to the combination of the metal felly band and wooden felly, for an all-metal construction of the same general form and purpose may be substituted; and where the words "felly band" appear hereinafter they are used in this inclusive sense.

The felly band, as well shown in Fig. 2, is provided with a large valve-stem-opening 6. The outer end of the hole is usually considerably larger than the valve stem 7, while the inner end nearly fits the stem; the hole being conical to make it easy to drop the valve stem through the wheel felly when placing the rim and tire on the wheel. Most automobile wheels of present-day construction which carry rim securing wedge-lugs, have valve holes thus proportioned to the valve stem.

8 is the demountable rim. As here shown it has integral flanges 8', 8' shaped to receive a straight-side pneumatic tire. In lieu of such flanges, integral clencher flanges may be used. And one or both flanges of the rim may be detachable from the body of the rim in well known manner, and not affect the operation or utility of the herein described invention. The rim 8 is split or cut apart at one point on a transverse line. Thus, 9 represents the split in the rim, and 8ª is one end of the rim and 8ᵇ the other. I prefer a diagonal split, as shown in Figs. 3 and 4, the same being of the kind and for the purpose set forth in application Serial No. 502,069 filed June 14, 1909. The outer side of the rim is supported by the wedge-lugs 5 and preferably by intermediately positioned supporting studs 10, though neither is requisite to the present invention.

The tire 11 is seated on the rim 8 and it is customary to keep the tire inflated thereon whether or not the rim is in position on the wheel. The pressure of the inflated tire tends to collapse the rim. The pressure of the wedge-lugs tends to expand the rim. To overcome both tendencies I employ a single device at the split 9 in the rim. This device comprises two members and as about to be described, preferably and conveniently serves many purposes.

Referring now to Figs. 1 to 5 it will be noted that one member or plate 12 is secured to the inner periphery of the rim at the end 8ª by rivets 13, or by welding. The plate projects beyond the rim and, therefore, laps beneath and upon the inner face of the end 8ᵇ of the rim. On the end 8ᵇ I rivet or weld a second member or plate 12¹. The plates are preferably curved, like the rim surface to which they apply and, preferably, one or both plates 12, 12¹ serve as the spacer between the rim ends and the face or felly band of the wheel; that is, they are of a thickness to fill the space between the rim and the felly band as shown in Figs. 1, 2, 8 and 10. For ease of operation I prefer that the plates shall be of less width than the body of the rim. In the rim end 8ʰ and adjacent to the split 9 I provide a hole 14 for the valve stem 7. This hole, as shown in Figs. 2, 3 and 4 is smaller than the hole 6 in the felly band. I make the hole at this point in order that the spreader 7ª of the valve stem 7 (see dotted lines Fig. 2) may close or bridge the split 9, and thus keep the inner casing or air tube of the tire out of the split.

I provide each of the two members 12, 12¹, with a semi-circular projection 12ª, 12ᵇ, respectively. These projections substantially conform to the hole 14 and when the members are in abutment, as shown in Fig. 3 the two projections 12ª, 12ᵇ form a boss or circular projection of a size to enter and fit the hole 6 in the felly band as shown in Fig. 2. When thus positioned, it is obvious that the projections 12ª, 12ᵇ and the felly band in which they are confined serve to positively connect the ends of the rim and prevent the separation thereof by the force of the wedge-lugs. The line of separation between the members 12ª and 12ᵇ may be variously positioned so long as the plates are not so interlocked in opposition to the split 9 as to prevent the easy separation of the rim ends as required to put the rim onto or take it from a tire. The members are preferably positioned to take the thrust of the rim ends and prevent the angularly cut ends of the rim from being in more than contact. It is desirable that they be separated about a thirty-second of an inch.

In Figs. 3 and 4 the position of the valve stem is shown by dotted lines 15. To prevent interference with the valve stem when the interlocked members 12 and 12' are put together and taken apart I form the ends of said members upon lines 16 sharply oblique to the middle plane of the rim. This permits the members to be separated in a lateral or transverse direction without interference from or with the valve stem. And to prevent the accidental separation of the plates or members I preferably provide them with complementary sockets and projections 12ᶜ and 12ᵈ. These co-act in the manner represented in Fig. 3 and firmly aline the ends of the rim; and yet the plates may be readily separated by opening the gap of the rim or by pressing the end 8ª inward with respect to the end 8ᵇ; after which the ends of the rim may be separated as shown in Fig. 4. It will be understood that the ends of the rim cannot be separated as long as the members 12 and 12' are interlocked within the felly of the wheel. It will also be understood that while so interlocked the connecting members perform the function of a driver, that is, they secure the rim against rotation with respect to the wheel upon which it is mounted.

In placing the described rim in a tire, the valve stem of the latter is first put through the hole 14 and the rim end 8ᵇ is placed on the beads of the tire. Starting at that point, the rim is progressively placed upon the beads of the tire, the end 8ª being the last to enter the tire. Obviously the angularity of the split makes it possible easily to enter the end 8ª. At that moment the complementary ends of the members 12, 12¹ snap together and thereafter hold the rim ends in true alinement. The described formation of the complementary members permits them to pass into this position without interfering with the valve stem in the hole 14. When the rim has been placed in the tire in this manner, the tire is then inflated, after which it may be placed on the wheel. At that time the complementary driver projections 12ª, 12ᵇ enter the hole 6 in the wheel felly, and thereafter the rim is secured by means of the wedge-lugs 5, in the usual manner. When the rim is removed from the wheel and after the tire is deflated, the end 8ª of the rim easily may be forced inward to free the ends of the rim from one another and permit the rim to be removed from the tire, such action being the reverse of that above described.

Though it is desirable to close the split by means of the valve stem spreader, as above described, the valve stem hole is not always located at or adjacent to the split but is remote therefrom, and sometimes diametrically opposite the split. In that case it is unnecessary that the connecting members shall contain an opening to accommodate the valve stem; for as represented in Figs. 6, 7 and 8, the valve stem hole 14$^x$ is more or less remote from the split 9$^x$. In such case I provide the felly band with a second hole 17, as indicated in Fig. 8. In this case the plates 12$^x$ and 12$^y$ are again complementary and have shoulders 18 that interlock against the lateral separating tendency of the rim. As shown the end 19 of each plate or member slightly overlaps the opposite end of the rim to prevent dislodgment thereof in a radial direction. Formed on each plate is a projection 20 and the two projections preferably form a round stud to fit a round hole 17 in the felly band. That is, these projections form the driver of the rim and when in the felly hole effectively lock the ends of the rim together. Where the felly band carries driving projections 21, 21, (see Fig. 10) which I sometimes use, I dispense with the projections on the interlocking plates and set the latter between such projections 21, 21. Thus, as in Figs 9 and 10, 22 and 23 are identical plates having interlocking ends 24 and secured on respective ends of the rim 8. Obviously when thus connected the rim ends are held against lateral or radial displacement until the rim is placed on the wheel and thereafter are also secured against separation by the wedges.

As used in the appended claims the word "rim" means—a suitably flanged, tire-carrying, demountable wheel rim; and, the word "transplit" means — transversely split—containing a transverse split.

While I have illustrated and described my invention in accordance with the patent statutes, I desire it to be understood that the details of construction may be materially varied and that various changes, modifications and substitutions may be made in the demountable rim herein illustrated without departing from the spirit and scope of my invention as set forth in the appended claims.

Having thus described my invention, I claim as new and desire to secure by Letters Patent:

1. A diagonally transplit rim, in combination with complementary rim-end interlocking plates upon the inner periphery of the rim secured to respective ends and holding said ends slightly apart.

2. A diagonally transplit rim, in combination with complementary rim-end interlocking plates upon the inner periphery of the rim, secured to respective ends thereof, holding them apart and together forming a driver.

3. A diagonally transplit rim, in combination with complementary rim-end interlocking plates secured to respective ends of the rim and one overlapping the opposed end, said plates normally holding the rim ends apart and together forming a driver.

4. A transplit rim, in combination with complementary end interlocking members fixed upon the inner periphery of the rim, one of said members bridging the split in the rim and the other, with the rim end to which it is secured, containing a valve stem hole.

5. A transplit rim containing a valve stem hole and having upon its inner periphery two complementary end-interlocking members, the same being fixed to respective ends of the rim, and having projections which together form a driver and a valve stem bushing.

6. A transplit rim containing a valve stem hole adjacent its split, in combination with two plates fixed to respective ends of the rim upon the inner periphery thereof, said plates together containing a continuation of said valve stem hole and being engaged upon an irregular line that intersects the hole therein.

7. A transplit rim containing a valve stem hole adjacent its split, in combination with two plates fixed to respective ends of the rim upon the inner periphery of the rim and provided with semicircular driving flanges, said plates and their flanges containing a continuation of said valve stem hole and the two being engaged upon an irregular line to interlock the ends of the rim.

8. A transplit rim containing a valve stem hole adjacent its split, in combination with two identical stampings fixed to respective ends of the rim upon the inner periphery of the rim and provided with semicircular driving flanges, said plates and their flanges containing a continuation of said valve stem hole and the two being engaged upon an irregular line to interlock the ends of the rim.

9. A transplit rim, in combination with two stampings fixed to respective ends of the rim upon the inner periphery thereof and each presenting a semicircular flange, which flanges together form a driver.

10. A transplit rim, in combination with two complementary interlocking stampings fixed to respective ends of the rim upon the inner periphery thereof and each presenting a semicircular flange, which flanges together form a driver.

11. A wheel felly band containing a valve stem hole, in combination with a transplit rim having upon its ends fixed complementary members which co-act with the hole in the wheel felly and form a rim driver and prevent expansion of the rim on the felly.

12. A wheel felly band containing a valve stem hole, in combination with a transplit rim containing a valve stem hole adjacent to its split, and two complementary members fixed upon respective ends of the rim and each formed to accommodate the valve stem and having a driving part to enter the hole in said felly.

13. A wheel felly band containing a valve stem hole, in combination with a transplit rim containing a valve stem hole adjacent to its split, and two complementary members fixed upon respective ends of the rim and abutting upon an irregular line and each formed to accommodate the valve stem and having a driving part to enter the hole in said felly.

14. A transplit rim in combination with plates fixed to respective ends of the rim upon the inner periphery thereof and interlocked upon an irregular line and opposing lateral separation of the rim ends, each plate having an integral inwardly extending projection, and said projections being normally in abutment and together forming a driver to co-act with a wheel felly.

15. A transplit rim containing a valve stem hole separate from but adjacent its split, in combination with two plates fixed to respective ends of the rim upon the inner periphery thereof, said plates together containing a continuation of said valve stem hole and being engaged upon a line that intersects said hole.

In testimony whereof, I have hereunto set my hand, this 2nd day of March, 1914, in the presence of two subscribing witnesses.

ERLE K. BAKER.

Witnesses:
N. CURTIS LAMMOND,
JAMES S. DODGE, Jr.

Copies of this patent may be obtained for five cents each, by addressing the "Commissioner of Patents, Washington, D. C."